United States Patent
Zawierka

(10) Patent No.: US 11,120,198 B2
(45) Date of Patent: Sep. 14, 2021

(54) METHOD AND SYSTEM FOR GENERATING AND SUBMITTING A PETITION

(71) Applicant: Paul Zawierka, Brooklyn, NY (US)

(72) Inventor: Paul Zawierka, Brooklyn, NY (US)

(\*) Notice: Subject to any disclaimer, the term of this patent is extended or adjusted under 35 U.S.C. 154(b) by 0 days.

(21) Appl. No.: 16/222,354

(22) Filed: Dec. 17, 2018

(65) Prior Publication Data
US 2019/0188250 A1 Jun. 20, 2019

Related U.S. Application Data

(60) Provisional application No. 62/599,821, filed on Dec. 18, 2017, provisional application No. 62/599,832, filed on Dec. 18, 2017, provisional application No. 62/599,836, filed on Dec. 18, 2017, provisional application No. 62/599,840, filed on Dec. 18, 2017, provisional application No. 62/599,851, filed on Dec. 18, 2017, provisional application No. 62/599,853, filed on Dec. 18, 2017, provisional application No. 62/599,857, filed on Dec. 18, 2017, provisional application No. 62/599,862, filed on Dec. 18, 2017, provisional application No. 62/725,563, filed on Aug. 31, 2018.

(51) Int. Cl.
*G06F 17/00* (2019.01)
*G06F 40/166* (2020.01)
*G06Q 10/10* (2012.01)
*G06Q 50/26* (2012.01)

(52) U.S. Cl.
CPC .......... *G06F 40/166* (2020.01); *G06Q 10/10* (2013.01); *G06Q 50/26* (2013.01)

(58) Field of Classification Search
CPC .... G06F 3/4842; G06F 3/4883; G06F 3/0488; G06F 40/166; G06Q 10/10; G06Q 50/26
USPC .......................................................... 715/256
See application file for complete search history.

(56) References Cited

U.S. PATENT DOCUMENTS

| | | | |
|---|---|---|---|
| 2004/0243678 A1* | 12/2004 | Smith | H04L 51/12 709/206 |
| 2007/0277242 A1* | 11/2007 | Baker | H04L 63/1441 726/25 |
| 2009/0149155 A1* | 6/2009 | Grossman | G06Q 30/02 455/411 |
| 2009/0307065 A1* | 12/2009 | Kincaid | G06Q 10/10 705/12 |

(Continued)

*Primary Examiner* — Hassan Mrabi
(74) *Attorney, Agent, or Firm* — Andrew G. Morabito

(57) ABSTRACT

The present invention is in the field of petition submissions to various agencies. Specifically a computer-implemented method of petition submission, comprising: identifying, by one or more processors, a topic for a petition, establishing, by one or more processors, the petition receiving agency, determining, by one or more processors, the petition receiving agency parameters, generating, by one or more processors, a petition, wherein the petition requirements are based on the determined petition receiving agency parameters, receiving, by one or more processors, a signature, wherein the signature is associated with the petition, analyzing, by one or more processors, the signature, to determine if the signature meets the petition requirements set forth, and submitting, by one or more processors, the signature associated with the petition to the petition receiving agency.

9 Claims, 3 Drawing Sheets

(56) References Cited

U.S. PATENT DOCUMENTS

| | | | |
|---|---|---|---|
| 2011/0224933 A1* | 9/2011 | Hood | G06Q 10/06 |
| | | | 702/81 |
| 2011/0252112 A1* | 10/2011 | Glanton | G06F 21/604 |
| | | | 709/217 |
| 2014/0324442 A1* | 10/2014 | Barnes, III | H04L 41/22 |
| | | | 705/1.1 |
| 2015/0206265 A1* | 7/2015 | Tupa | G06Q 50/26 |
| | | | 705/7.29 |
| 2015/0279139 A1* | 10/2015 | Kincaid | G07C 13/00 |
| | | | 705/12 |
| 2017/0011473 A1* | 1/2017 | Osman | G06Q 50/01 |

* cited by examiner

METHOD AND SYSTEM FOR GENERATING AND SUBMITTING A PETITION

BACKGROUND

This disclosure relates generally to the interaction with an electronic petition, and more specifically to a method, computer program and computer system for interacting with the petition through various methods and forms of publishing one's interactions.

The Internet comprises a vast number of computers and computer networks that are interconnected through communication links. The interconnected computers exchange information using various services, such as electronic mail, Gopher, and the World Wide Web ("WWW"). The WWW service allows a server computer system (i.e., Web server or Web site) to send graphical Web pages of information to a remote client computer system. The remote client computer system can then display the Web pages. Each resource (e.g., computer or Web page) of the WWW is uniquely identifiable by a Uniform Resource Locator ("URL"). To view a specific Web page, a client computer system specifies the URL for that Web page in a request (e.g., a Hypertext Transfer Protocol ("HTTP") request). The request is forwarded to the Web server that supports that Web page. When that Web server receives the request, it sends that Web page to the client computer system. When the client computer system receives that Web page, it typically displays the Web page using a browser. A browser is a special-purpose application program that effects the requesting of Web pages and the displaying of Web pages.

The World Wide Web is especially conducive to sharing information and supporting causes. Many Web servers have been developed through which users can petition to support their causes or access the various causes and petitions that support their ideals. This can be various injustices, endangered species, suppressed groups of people, the environment, and legal issues, and the like.

A user, who is interested in a cause may have to browse through many webpages or sites, to locate the specific cause which they are interested in supporting. Many times the user gets discouraged through the vast number of web pages to find the cause. In some instances, the user may find several web pages supporting similar causes, but not the specific cause they are looking for. Once the user is able to locate the specific web page or cause, they are then required to input a large quantity of data, usually including sensitive information about the user Current systems are cumbersome and time-consuming and don't offer the ability to change the way you voted if the facts change, users that are active in the field of activism have to go through a lengthy process to sign multiple petitions. Therefore, it is desired for a method, computer program, or computer system to allow a user to easily access various causes and easily sign one or more petition.

SUMMARY

The present invention is directed generally to petition submissions to various agencies, such as people, governments, corporation, non-profit or the like. In a first embodiment, the present invention is a computer-implemented method of petition submission, comprising: identifying, by one or more processors, a topic for a petition; establishing, by one or more processors, the petition receiving agency; determining, by one or more processors, the petition receiving agency parameters; generating, by one or more processors, a petition, wherein the petition requirements are based on the determined petition receiving agency parameters; receiving, by one or more processors, a signature, wherein the signature is associated with the petition; analyzing, by one or more processors, the signature, to determine if the signature meets the petition requirements set forth; and submitting, by one or more processors, the signature associated with the petition to the petition receiving agency.

In a second embodiment, the present invention is a computer program product for petition submission, the computer program product comprising: one or more computer readable storage media and program instructions stored on the one or more computer readable storage media, the program instructions comprising: program instructions to identify a topic for a petition; program instructions to establish the petition receiving agency; program instructions to determine the petition receiving agency parameters; program instructions to generate wherein the petition requirements are based on the determined petition receiving agency parameters; program instructions to receive a signature, wherein the signature is associated with the petition; program instructions to analyze the signature, to determine if the signature meets the petition requirements set forth; and program instructions to submit the signature associated with the petition to the petition receiving agency.

In a third embodiment, the present invention is a computer system for of petition submission, the computer program product comprising: one or more computer processors, one or more computer readable storage media, and program instructions stored on the one or more computer readable storage media for execution by, at least one of the one or more processors, the program instructions comprising: program instructions to identify a topic for a petition; program instructions to establish the petition receiving agency; program instructions to determine the petition receiving agency parameters; program instructions to generate wherein the petition requirements are based on the determined petition receiving agency parameters; program instructions to receive a signature, wherein the signature is associated with the petition; program instructions to analyze the signature, to determine if the signature meets the petition requirements set forth; and program instructions to submit the signature associated with the petition to the petition receiving agency.

Figure 1:
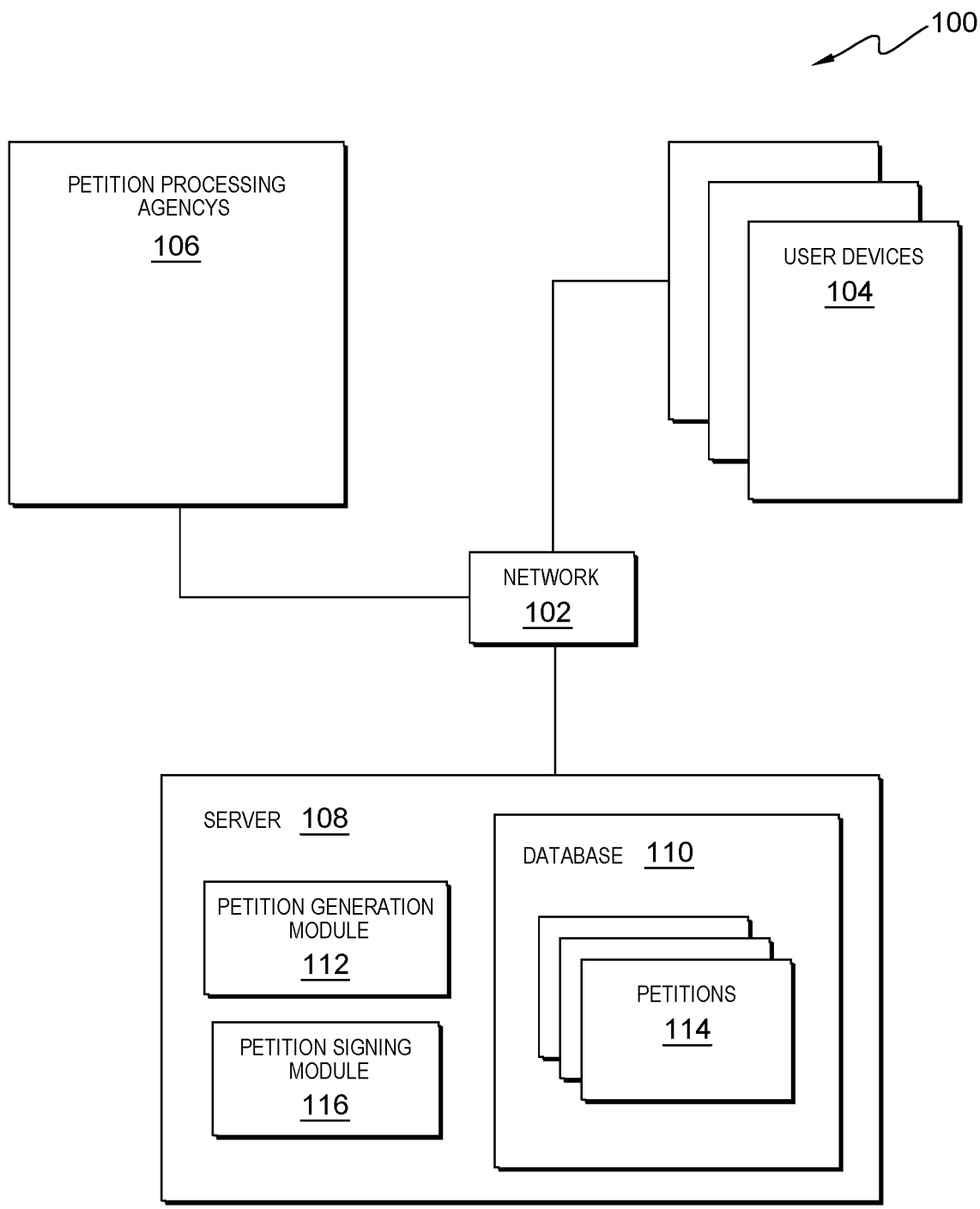
FIG. 1 depicts a block diagram depicting a computing environment, in accordance with one embodiment of the present invention.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects may generally be referred to herein as a "circuit," "module", or "system." Furthermore, aspects of the present invention may take the form of a computer program product embodied in one or more computer readable medium(s) having computer readable program code/instructions embodied thereon.

The system, method, or computer program product is able to generate a petition (e.g. application, plea, proposal, proposition, questionnaire, solicitation or the like) related to various causes. These causes may be based on current or past events, topics, ideas, or concepts, and submit the petition to the appropriate agency (e.g. government, organization, political party, corporation, non-profit organization, individual, politician, entity, or the like) and meet the requirements of the agency for the submission of a petition. The system, method, or computer program product allows users to access the various petitions, gather information about the various cause, and support the cause. The system, method, or computer program product assists in providing an easy and user intuitive interface to allow the users to locate relevant and like petitions. The system, method, or computer program product assists in gathering the necessary information from the user to sign the petition.

The present invention will now be described in detail with reference to the Figures.

FIG. 1 depicts a block diagram of a computing environment 100 in accordance with one embodiment of the present invention. FIG. 1 provides an illustration of one embodiment and does not imply any limitations regarding the environment in which different embodiments may be implemented. In the depicted embodiment, computing environment 100 includes network 102, one or more user devices 104, petition processing agency 106, and one or more server 108. Computing environment 100 may include additional servers, computers, or other devices not shown.

Network 102 may be a local area network (LAN), a wide area network (WAN) such as the Internet, any combination thereof, or any combination of connections and protocols that can support communications between petition processing agency 106, the user devices 104, and server 108 in accordance with embodiments of the invention. Network 102 may include wired, wireless, or fiber optic connections. The network 102 can include links using technologies such as Ethernet, 802.11, worldwide interoperability for microwave access (WiMAX), 3G, 4G, 5G, CDMA, GSM, LTE, digital subscriber line (DSL), etc. Similarly, the networking protocols used on the network 102 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 102 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

User device(s) 104 comprise one or more computing devices which can receive input from a user and transmit and receive data via network 102. The user devices 104 may be any other electronic device or computing system capable of processing program instructions and receiving and sending data. In one embodiment, the user devices 104 is a conventional computer system executing, for example, a Microsoft Windows compatible operating system (OS), Apple OS X, and/or a Linux distribution. In another embodiment, the user devices 104 can be a device having computer functionality, such as a smart-phone, a tablet, a personal digital assistant (PDA), a mobile telephone, etc. In some embodiments, user devices 104 may be a laptop computer, tablet computer, netbook computer, personal computer (PC), a desktop computer, or any programmable electronic device capable of communicating with petition processing agency 106 and server 108 via network 102. In other embodiments, user devices 104 may represent a server computing system utilizing multiple computers as a server system, such as in a cloud computing environment. In another embodiment, user devices 104 represents a computing system utilizing clustered computers and components to act as a single pool of seamless resources.

In one embodiment, the user devices 104 interact with the petition processing agency 106 through an application programming interface or petition module 112, such as iOS and ANDROID. The user device 104 may display content through the processing of markup language and displaying this information through the application 110. The application 110 displays the identified content using the format or presentation described by the markup language. Examples of the markup language are extensible markup language (XML) data, extensible hypertext markup language (XHTML) data, or other markup language data. The application 110 may also include the ability to process JavaScript Object Notation (JSON) data, JSON with padding (JSONP), and JavaScript data to facilitate data-interchange between the petition processing agency 106 and the user device 104 and the user device 104 and the server 108. In other embodiments, user devices 104 may include any combination of petition module 112, database 110. User devices 104 may include components, as depicted and described in further detail with respect to FIG. 4.

The petition processing agency 106 may be operated by a network provider, whereas the server 108 and the user devices 104 are separate from the petition processing agency 106 and operate independently. The petition processing agency 106 is the government agency, or body which receives and processes the petitions which are submitted. For example, the White House petition submission is a petition processing agency 106. Each petition processing agency 106 has a set of requirements for the submission of the petitions, the number of signatures, the time frame to gather the signatures, and the requirements for the signatures to be valid, and the like depending on the petition processing agency 106. More than one petition processing agency 106 may be connected to the network 102. Petition processing agency 106 include the one or more computing devices for receiving and processing the petitions 114 upon receipt. Examples of these petition processing agencies 106 include local, state, federal, parliament, or the like petition hosting services, or private petition services. These services allow users to create or sign petitions for various causes which are being brought to the attention of the people. For example, these may be related to elections, changes in the law, awareness of issues with our oceans or environments, or other causes which are designed to appeal to a government or authority. Other data structures can also be used to represent the petition processing agency 106, including but not limited to databases, objects, classes, meta elements, files, or any other data structure. Users may join the petition processing agency 106 or may be connected to the service through the petition module 112. This network may vary from one service to next wherein web servers, API requests, external systems, authorization, security systems, privacy systems, logging systems, and the like may be incorporated.

Petitions 114 are each individual petition created by petition generation module 112. Each petition 114 is based on the petition processing agency 106 requirements. The petition 114 has a specific cause or purpose As various petition processing agencies 106 store their data in different manners, and with varying degrees of access to the public based on network security features and account privacy settings, each petition 114 is based on the petition processing agency's 106 requirements. In the depicted embodiment, these petitions 114 are located in database 110 petition processing agency 106. In additional embodiments, the petitions 114 may be stored in a plurality of locations and storage devices.

Database 110 may be a repository that may be written to and/or read by petition processing agency 106 various components, account profile 122 and account generated content 120 as well as other data associated with each account profile 122 may be stored in database 110. Such information may include account information, account activity, account relationships, and other account features. In one embodiment, database 110 is a database management system (DBMS) used to allow the definition, creation, querying, update, and administration of a database(s). In the depicted embodiment, database 110 resides on server 108 petition processing agency 106. In other embodiments, database 110 resides on another server, or another computing device, provided that database 110 is accessible by the petition processing agency 106 and its components.

Server 108 may be a management server, a web server, or any other electronic device or computing system capable of processing program instructions and receiving and sending data. In another embodiments server 108 may be a laptop computer, tablet computer, netbook computer, personal computer (PC), a desktop computer, or any programmable electronic device capable of communicating via network 102. In one embodiment, server 108 may be a server computing system utilizing multiple computers as a server system, such as in a cloud computing environment. In one embodiment, server 108 represents a computing system utilizing clustered computers and components to act as a single pool of seamless resources. In the depicted embodiment petition module 112 is located on server 108. Server 108 may include components, as depicted and described in further detail with respect to FIG. 4.

Petition generation module 112 functions to review publications, determine the petition content, analyze the petition processing agency 106, and create the petition 114. In the depicted embodiment, petition generation module 112 resides on server 108 and utilizes network 102 to access petition processing agency 106 and user device 104. In one embodiment, petition generation module 112 resides on a separate server 108. In other embodiments, petition generation module 112 may be located on another server, computing device, or exist in a cloud computing system provided petition generation module 112 has access to petition processing agency 106 and user devices 104.

The petition signing module 116, processes the request to sign the petition 114 and processing the submission of the signatures to the petition processing agency 106. The petition signing module 116 assists the user in centralizing the petitions 114 related to topics and causes which of are concern to them, and also provide viable information about other topics and causes which the user may be unaware of, or unable to locate. The petition signing module 116, also assists these users in properly and correctly completing the signing or joining process for these petitions. Various modules may be included to complete these functions. In the depicted embodiment, petition signing module 116 resides on server 108 and utilizes network 102 to access petition processing agency 106 and user device 104. In one embodiment, petition signing module 116 112 resides on a separate server 108. In other embodiments, petition signing module 116 may be located on another server, computing device, or exist in a cloud computing system provided petition signing module 116 has access to petition processing agency 106 and user devices 104.

In some embodiments, may have one or more servers that include one or more web pages, which are communicated to the user device 104 using the network 102. The server 108 is separate from the petition processing agency 106 and their web pages provide the markup language documents created by the petition generation module 112, which identify the content to the user device 104 if no application which can process the content is present on the user device 104.

Figure 2:
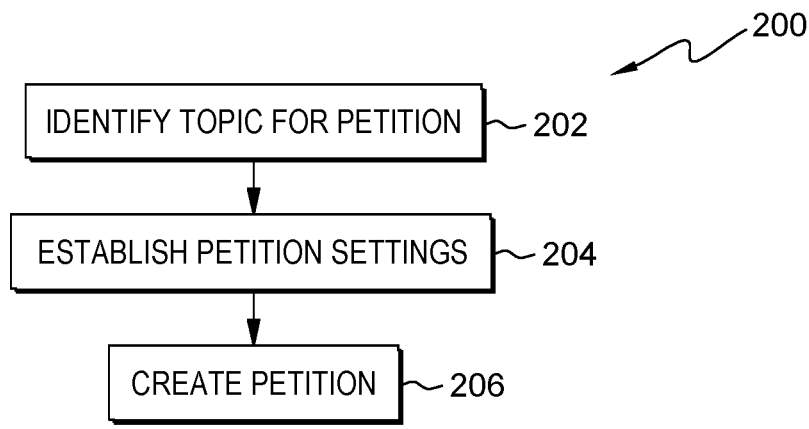
FIG. 2 depicts a flowchart of the operational steps taken by petition generation module to create a petition, in accordance with an embodiment of the present invention.

FIG. 2 depicts flowchart 200 depicting the operational steps taken by the module to identify topics, issues, or events which are to be converted into petitions to be submitted to the various petition networking systems 106. It should be appreciated that there can be additional, fewer, or alternative steps performed in similar or alternative orders, or in parallel, in accordance with the various embodiments discussed herein unless otherwise stated. The method(s) and associated process(es) are now discussed, over the course of the following paragraphs, with extensive reference to FIG. 2, in accordance with one embodiment of the present invention. The purpose of the process(s) performed are to gather the relevant user information to properly interact with the cause based on the petition requirements.

In step 202, petition generating module 112 identifies topic(s) for a petition. Through the various news outlets, and public information, the petition generation module 112 assesses, and determines if a petition is necessary to invoke the attention of an organization or government body. Through various researching and reviewing protocols of news stories or other published articles or information. The petition generating module 112 is able to identify topic(s) which are relevant to be converted into a petition.

Either manually or through at least one other machine learning models train the petition generating module 112 to determine if the publication meets the requirements to justify the generation of a petition 114. Manually publications may be reviewed and set of petitions are created to generate a set for the training module to assist the petition generation module 112. The petition generation module 112 is trained to review publications, the content, the topics, the publication date, and various other factors to better determine the relevance of the publication to material which would be appropriate to create a petition for.

The processed publications are used to generate a training dataset for at least one machine learning model. The generated training dataset is used to develop a machine learning model to determine independently if a publication is adequate to become a petition 114. In some instances, a plurality of machine learning models can be developed to more optimally determine such relevance.

The petition generation module 112, is able to review the past petitions 114 stored in the database 108 to determine if a new petition is a duplicate of an already existing petition. In some embodiments, where the previous petition is still accepting signatures, the petition generation module 112 does not create a duplicate. In some embodiments, where the previously generated petition 114 is closed, or of a predetermined age, the petition generation module 112 creates a new petition 114. In some embodiments, when a petition is not submitted or does not meet the requirements for approval by the agency, the petition may be recreated by the petition generation module 112, and the previously gathered signatures are automatically incorporated into the newly created petition.

In some embodiments, each petition 114 may be assigned a topic or category associated with the content of the petition (e.g. environment, health, animals, water, etc.), the organization sponsoring the petition (e.g. an alliance, company, organization, or famous person), and the associated agency which the petition is submitted to (e.g. the White House, United States government, a foreign government or agency, etc.). In some embodiments, the petition module 112 identifies if a user can redact their signature, and the associated process of redacting the signature.

In step 204, the petition generation module 112, analyzes and establishes the required information for completing the petition(s) 114. The petition generation module 112 determines the necessary/required information for the user to sign the petition(s) 114. In some embodiments, the petition module 112 may have previously stored data related to the petition network service 106 requirements. In additional embodiments, the petition module 112 processes the petition to determine the required/necessary information requests for a complete entry for the signing of the petition. In some embodiments, this is the requirements to submit the signatures to the petition processing agency 106. For example, in some cases, the petition generation module 112 retains the signatures locally until a predetermined number is met and submits the signatures at once. In another embodiment, the petition generation module 112 submits each signature to the petition processing agency 106 at the time of receipt of the signature.

In some embodiments, petition generation module 112 is able to determine if a signature can be redacted from the petition once it is submitted to the petition processing agency 106.

In step 206, the petition generation module 112, creates a new petition. Through the determination that a petition 114 is to be created, the petition generation module 112, selects the topic for the petition 114. The petition 114 once created, is provided through both a recent petition list, as well as a topic related petition list to the user.

Figure 3:
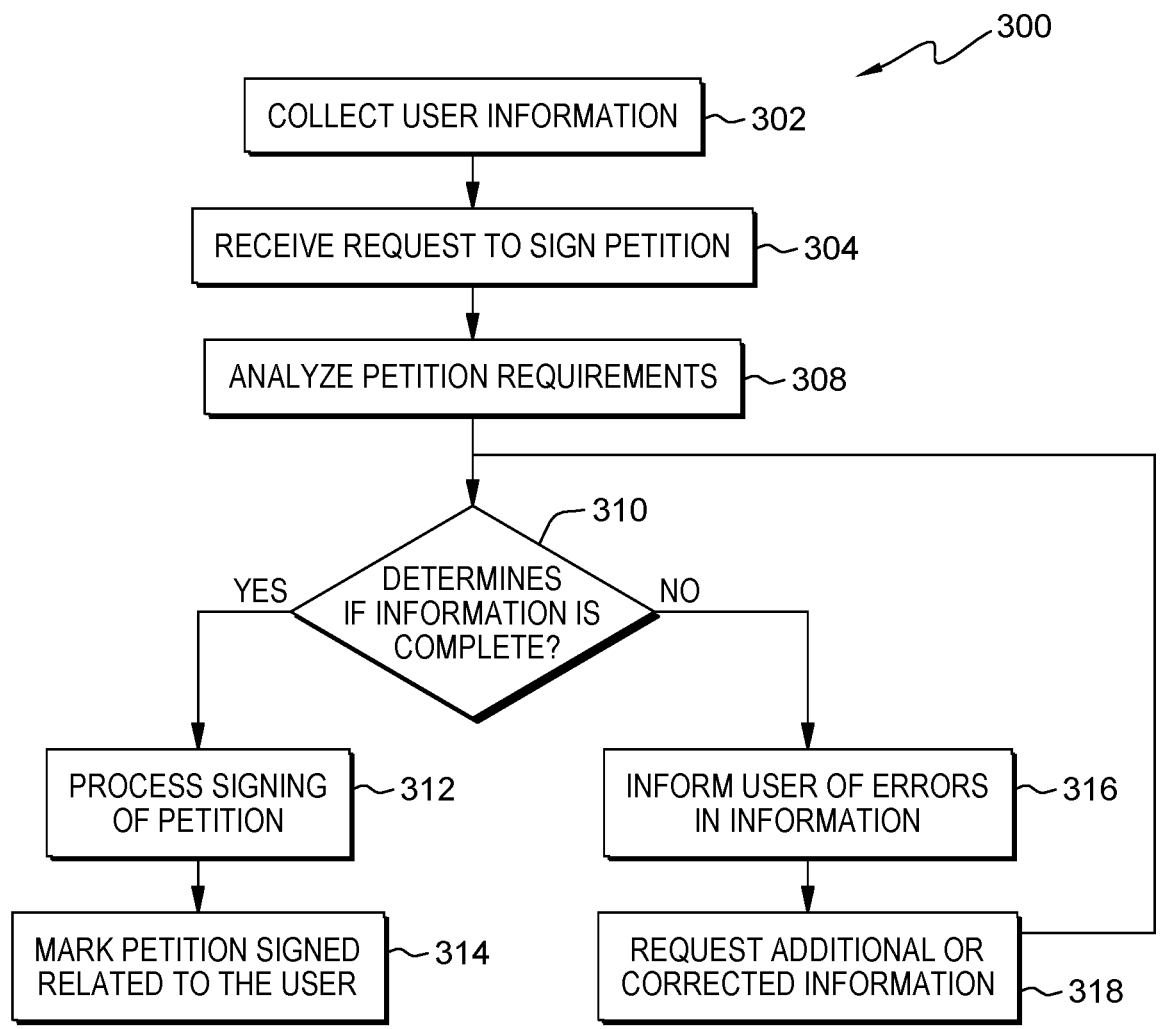
FIG. 3 depicts a flowchart of the operational steps taken by petition signing module to sign the petition, in accordance with an embodiment of the present invention.

FIG. 3 shows flowchart 300 depicting the operational steps taken by the module to collect the information from the user to adequately complete a petition 114 signing, according to an embodiment of the present disclosure. It should be appreciated that there can be additional, fewer, or alternative steps performed in similar or alternative orders, or in parallel, in accordance with the various embodiments discussed herein unless otherwise stated. The method(s) and associated process(es) are now discussed, over the course of the following paragraphs, with extensive reference to FIG. 2, in accordance with one embodiment of the present invention. The purpose of the process(es) performed are to gather the relevant user information to properly interact with the cause based on the petition requirements.

In step 302, petition signing module 116 collects user information. Through either manually submitted, or gathered data from user device 104, the petition signing module 116 collects data related to the user. This may be, but not limited to, name, address, location, interests, causes, or the like. In some embodiments, the petition signing module 116, through previously completed petition applications, identifies information which is needed from the user, such as driver's license or identification number, social security, or the like. The collected data is stored in database 110, in and some embodiments encrypted or secured based on the type of information.

In some embodiments, the user supplies information is related to topics, subjects, causes which are of interest to the user. In additional embodiments, the petition signing module 116 may request information on a company, celebrity, topic, or the like to assist in providing the user with directed petitions and information. In some embodiments, this requested information may be, but not limited to, the environment, endangered species, legal decisions, health, homelessness, and the like. In additional embodiments, the information may be able celebrities or famous persons that have individual causes which the user may be interested in supporting.

In step 304, the petition signing module 116 receives a request to sign the petition(s) 114. The petition signing module 116 receives the request from the user of the desire to sign the petition(s) 114. In some embodiments, the user may have selected a single petition 114 to sign. In additional embodiments, the user may have selected multiple petitions 114 from a plurality of petition processing systems 106.

In situations where the user requests the signing of more than one petition 114, the petition signing module 116 receives the user's selection. With many petitions 114 directed to similar causes, issues, topics, or subjects, a user may have an interest in signing multiple petitions 114 at once. After the user selects a cause, topic, or other category, the user is presented with the option to sign one, some, or all of the petitions with a single click. The ability to sign more than one petition is performed by a single click of a button, slider, or other simplified process.

In some embodiments, the petition signing module 116 receives permission to allow a third party to sign on behalf of the user. User's may permit an agencies or person to be able to submit their "signature" with the petition. The petition signing module 116, requests the user to approve the third party signing prior to allow the third party to sign on behalf of the user. This may be employed where the signatures need to be submitted at a specific time or manner based on the petition network services 106, or if the user approves of the agency or person. If the user permits the petition signing module 116 to grant the authority for the third party to sign on behalf of the user, the third party is given control of the submission process of the signing of that specific petition(s) 114.

In some embodiments, the user identifies at least one petition 114 to be "marked" related to the user. The user then has the option to locate the petition(s) 114 at a later time to sign. This feature assists the user where there are multiple petitions the user is interested in or is unable to review the entirety of the petition and requires additional time. In some embodiments, the petition module 114 processes the stored petitions, and associates this information with the user to improve the identification process of future petitions presented to the user.

In additional embodiments, the user's created list may become public for other users to see based on their search requests and criteria to help decrease the time other users have to search the vast array of petitions to sign. In additional embodiment, the user is able to select a plurality of petitions associated with different topics, such as, but not limited to, water, environment, net neutrality, endangered species, domestic violence, and the like. These petitions may be from many different agencies or sources and the user is able to sign all of these petitions that are associated with their areas of interest.

In some embodiments, the petition module 114 is able to receive the request to sign the petition verbally from the user. Through natural language (NL) processing and speech recognition technology, the petition module 114 is able to process spoken words of the user to complete the various steps of the petition 114 signing process. Through a microphone incorporated into the user device 104, the petition module 114 is able to receive the audible requests to sign the petition. In additional embodiments, this natural language processing allows the petition module 114 to receive user account information, retract the signing of a petition, and process the various steps of the process which typically require physical interaction from the user.

In additional embodiments, the petition signing module 116 may provide the user with audible requests, push notification, email, or other type of notification or alert of various deadlines related to petitions, the creation of a new petition, or the inability to file a signature to one of the desired petition(s) 114.

In step 308, the petition signing module 116, analyzes the requirements for signing the petition(s) 114. The petition signing module 116 determines the necessary/required information for the user to sign the petition(s) 114. In some embodiments, the petition signing module 116 may have previously stored data related to the petition network service 106 requirements. In additional embodiments, the petition signing module 116 processes the petition to determine the required/necessary information requests for a complete entry for the signing of the petition.

In decision 310, the petition signing module 116 determines if the necessary information has already been collected for each of the petition(s) 114 the user is requesting to sign. Where different petition processing systems 106 require different information to properly complete the signing of the petition. The petition signing module 116 analyzes the user collected information, and determines if the information is both collected, and proper. Local, state, federal government agencies, and private agencies require different information to properly sign a petition and may require signers to be located in a specific geographical area (e.g. within the town or state in which the petition is related to). If the petition signing module 116 determines that the collected data is adequate to sign the petition 114 (YES branch, proceed to step 312) and the petition signing module 116 processes the signing of the petition(s) 114. If the petition signing module 116 determines that the necessary information is incomplete or improper, (No branch, proceed to step 316) the petition signing module 116 alerts the user.

In step 312, the petition signing module 116 processes the signing of the petition. The petition signing module 116 may process the signing automatically through the petition network service 106. In some embodiments the petition signing module 116 redirects the user to the petition 114 to manually complete a step of the signing process which requires human intervention. In some embodiments, a confirmation is supplied to the user that they have signed the petition.

In step 314, the petition signing module 116 marks the petition(s) 114. The marking of the signed petition(s) 114 allows the user to have a visual identifier of the petition(s) 114 which they have already signed. In additional embodiments, the petition signing module 116 may analyze this information and further filter the petitions presented to the user. In additional embodiments, the petition signing module 116 may categorize all signed petitions in a section for the user to review which petitions they have signed in the event they wish to remove their signature at a later time, where applicable. In some embodiments, the marking of the petition 114 for the user also informs the user of the submission of the signature, and if the ability to redact their signature is possible. For cases where the petition generation module 112 waits until a set number of signatures are received, or if the petition processing agency 106 permits the reacting of signatures, the user is able to redact their signature. This process is performed substantially similar to the signing of the petition 114. In situations where the signature is directly submitted to a petition processing agency 106 which does not allow redacting, the ability is nullified for the user.

In step 316, the petition signing module 116 informs the user of the error. In the event the petition signing module 116 is unable to complete the petition(s) 114 due to lack of required information. The petition signing module 116 identifies the required information from the user to complete the petition(s) 114. In some embodiments, the user may not have the proper geographical or requirements to sign specific petition(s) 114 based on the petition network service 106 requirements. The petition signing module 116 informs the user that they are unable to properly complete the petition due to the limitation of those who can sign the petition.

In step 318, the petition signing module 116, requests the required information from the user. The petition signing module 116, presents to the user what information is incorrect or incomplete for the petition(s) 114. The petition signing module 116, may present the user with the ability to supply the information for the petition signing module 116 to re-process the signing, present the user with the required information and direct the user to the petition network service 106. In the situations where, the new information is stored or updated to the user's account, the petition signing module 116 may request the user's permission before storing the new or updated information.

Based on the petition settings established in step 308, the signatures are either directly submitted to the petition processing agency 106 or are held locally until the time period has expired, or the minimum number of signatures has been reached.

In some embodiments, the petition signing module 116, presented the user with an option to publicize their signing to a social media outlet. For example, Facebook, twitter, WhatsApp, LinkedIn, reddit, messenger, or the like. In some embodiments, the publication of the petition permits a viewer of the publication to sign the petition as well.

Figure 4:
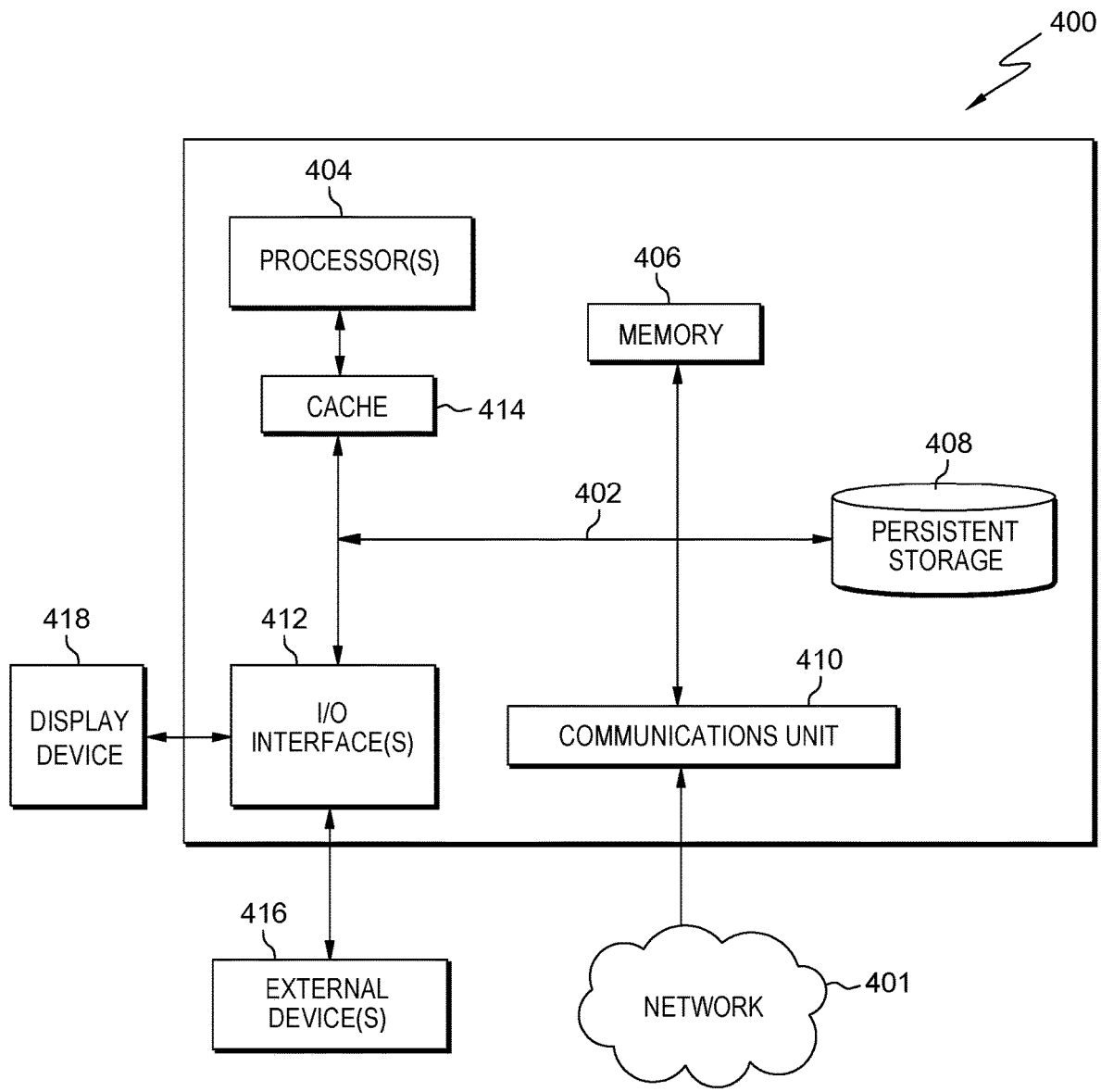
FIG. 4 depicts a block diagram of a computing device from FIG. 1, in accordance with an embodiment of the present invention.

FIG. 4 depicts a block diagram 400 of components of a computing device (e.g. user device 104, and/or server 108), in accordance with an illustrative embodiment of the present invention. It should be appreciated that FIG. 1 provides only an illustration of one implementation and does not imply any limitations with regard to the environments in which different embodiments may be implemented. Many modifications to the depicted environment may be made. It should be appreciated FIG. 1 provides only an illustration of one implementation and does not imply any limitations with regard to the environments in which different embodiments may be implemented.

Computing environment 400 is, in many respects, representative of the various computer subsystem(s) in the present invention. Accordingly, several portions of computing environment 400 will now be discussed in the following paragraphs.

Computing device 400 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any additional hardware components within a system. For example, communications fabric 402 can be implemented with one or more buses.

Computing device 400 is capable of communicating with other computer subsystems via network 401. Network 401 can be, for example, a local area network (LAN), a wide area network (WAN) such as the Internet, or a combination of the two, and can include wired, wireless, or fiber optic connections. In general, network 401 can be any combination of connections and protocols that will support communications between computing device 400 and other computing devices.

Memory 406 and persistent storage 408 are computer-readable storage media. In one embodiment, memory 406 includes random access memory (RAM) and cache memory 414. In general, memory 406 can include any suitable volatile or non-volatile computer-readable storage media.

Memory 406 is stored for execution by one or more of the respective computer processors 404 of computing device 400 via one or more memories of memory 406 of computing device 400. In the depicted embodiment, persistent storage 408 includes a magnetic hard disk drive. Alternatively, or in addition to a magnetic hard disk drive, persistent storage 408 can include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in the examples, provides for communications with other data processing systems or devices, including computing device 400. In the examples, communications unit 410 includes one or more network interface cards. Communications unit 410 may provide communications through the use of either or both physical and wireless communications links.

I/O interface(s) 412 allows for input and output of data with other devices that may be connected to computing device 400. For example, I/O interface 412 may provide a connection to external devices 416 such as a keyboard, keypad, camera, a touch screen, and/or some other suitable input device. External devices 416 can also include portable computer-readable storage media such as, for example, thumb drives, portable optical or magnetic disks, and memory cards. Software and data used to practice embodiments of the present invention, e.g., petition module 112 can be stored on such portable computer-readable storage media and can be loaded onto persistent storage 408 of computing device 400 via I/O interface(s) 412 of computing device 400. Software and data used to practice embodiments of the present invention, e.g., petition module 112 can be stored on such portable computer-readable storage media and can be loaded onto persistent storage 408 of computing device 400 via I/O interface(s) 412 of computing device 400. I/O interface(s) 412 also connect to a display 418. Display 418 may be various forms of virtual reality display, augmented reality display, or mixed reality display Display 418 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

What is claimed is:

1. A computer-implemented method of petition submission, comprising:

identifying, by one or more processors, a topic for a petition;

generating, by one or more processors a data set based on the review of third-party sources, wherein the data set establishes a set of criteria which is used to determine the conversion of the third-party sources into petitionable material;

establishing, by one or more processors, a receiving agency for the petition;

converting, by one or more processors, the generated data set and the identified topic to adhere to a set of requirements for the submission of a petition to the receiving agency;

analyzing, by one or more processors, the receiving agency for a list of submitted petitions and a set of requirements for the submission of the petition;

comparing, by one or more processors, the topic of the petition to the list of submitted petitions, and determining if the topic is similar to an active petition previously submitted to the receiving agency;

determining, by one or more processors, a set of parameters, which are required by the receiving agency for a complete submission for a petition;

presenting, by one or more processors, the petition to a set of users;

receiving, by one or more processors, a request to sign the petition by at least one user;

collecting, by one or more processors, a set of information associated with the at least one user whom requested to sign to the petition;

manipulating, by one or more processors, the set of information associated with each of the users, and a submission from a user to sign the petition, wherein the submission is comprised of collected user data, and is manipulated to meet the set of parameters required by the receiving agency is formed; and submitting, by one or more processors, the submission to the receiving agency.

2. The computer-implemented method of petition submission, or claim 1, wherein if it is determined that a signature does not meet the petition requirements, requesting, by one or more processors, the petition required information.

3. The computer-implemented method of petition submission of claim 1, wherein determines that the topic was covered by a previously submitted petition, further comprising, analyzing, by one or more processors, a previously submitted petition to determine if a new petition can be filed related to the topic.

4. The computer-implemented method of petition submission of claim 1, further comprising:

analyzing, by one or more processors, the identified topic to determine the petition eligibility of the identified topic; and converting, by one or more processors, the petition eligible identified topic into a receiving agency eligible petition.

5. A computer program product for petition submission, the computer program product comprising:

one or more computer readable storage media and program instructions stored on the one or more computer readable storage media, the program instructions comprising:

program instructions to identify a topic for a petition, wherein the topic for the petition is identified through an analysis of third-party sources;

program instructions to generate a data set based on the review of third-party sources, wherein the data set establishes a set of criteria which is used to determine the conversion of the third-party sources into petitionable material;

program instructions to establish a receiving agency for the petition;

program instructions to convert the generated data set and the identified topic to adhere to a set of requirements for the submission of a petition to the receiving agency;

program instructions to compare the topic for the petition to a list of petitions which were previously submitted to the receiving agency, and determining if the topic is covered by a previously submitted petition;

program instructions to determine a set of parameters, which are required by the receiving agency;

program instructions to manipulate a submission from a user to sign the petition, wherein the submission is comprised of collected user data, and is manipulated to meet the set of parameters required by the receiving agency.

6. The computer-implemented method of petition submission of claim 5, further comprising:

program instructions to receive a signature, and analyzing the signature to determine if the signature meets the set of requirements, wherein if the signature does not meet the set of requirements, further comprising:

program instructions to identify errors in the signature, and program instructions to request the submission of data which corrects the identified errors;

program instructions to determine that a predetermined number of signatures have been received and meet the set of parameters required by the receiving agency; and program instructions to submit the signatures to the receiving agency.

7. The computer-implemented method of petition submission of claim 5, further comprising:

program instructions to develop a training protocol to review the third-party publications to identify at least one potential petition topic, wherein the training protocol determines the relevance of the potential petition topic based on previously reviewed third-party publications, petitions, and receiving agencies.

8. A computer system for submission of a petition, the computer program product comprising:

one or more computer processors, one or more computer readable storage media, and program instructions stored on the one or more computer readable storage media for execution by, at least one of the one or more processors, the program instructions comprising:

program instructions to process third-party publications to identify a topic;

program instructions to analyze the identified topic to a data set to convert the identified topic is a petition topic;

program instructions to generate a data set based on the review of third-party sources, wherein the data set establishes a set of criteria which is used to determine the conversion of the third-party sources into petitionable material;

program instructions to establish a receiving agency for a petition;

program instructions to convert the generated data set and the identified topic to adhere to a set of requirements for the submission of a petition to the receiving agency;

program instructions to compare the identified petition topic for the petition to a list of previously submitted petitions to the receiving agency, and determining if the petition topic is substantially similar to a previously submitted petition;

program instructions to determine a set of parameters, which are required by the receiving agency;

program instructions to generate a submission, wherein the submission meets the set of parameters required by the receiving agency;

program instructions to receive a signature, and analyzing the signature to determine if the signature meets the set of requirements; and program instructions to manipulate the submission from a user to sign the petition, wherein the submission is comprised of collected user data, and is manipulated to meet the set of parameters required by the receiving agency;

program instructions to submit the signatures to the receiving agency.

9. The computer system for of petition submission of claim 8, wherein program instructions to compare the identified petition topic for the petition to a list of previously submitted petitions to the receiving agency, and determining if the petition topic is substantially similar to a previously submitted petition, further comprises:

program instructions to convert the identified petition topic to comply with the previously submitted petition.

* * * * *